Aug. 9, 1966

W. S. ROUVEROL 3,265,949

VARIABLE SPEED INDUCTION MOTOR

Filed Sept. 20, 1963

INVENTOR.
WILLIAM S. ROUVEROL
BY
Gordon Wood
ATTORNEY

INVENTOR.
WILLIAM S. ROUVEROL
BY
Gordon Wood
ATTORNEY

Aug. 9, 1966    W. S. ROUVEROL    3,265,949
VARIABLE SPEED INDUCTION MOTOR
Filed Sept. 20, 1963    9 Sheets-Sheet 4
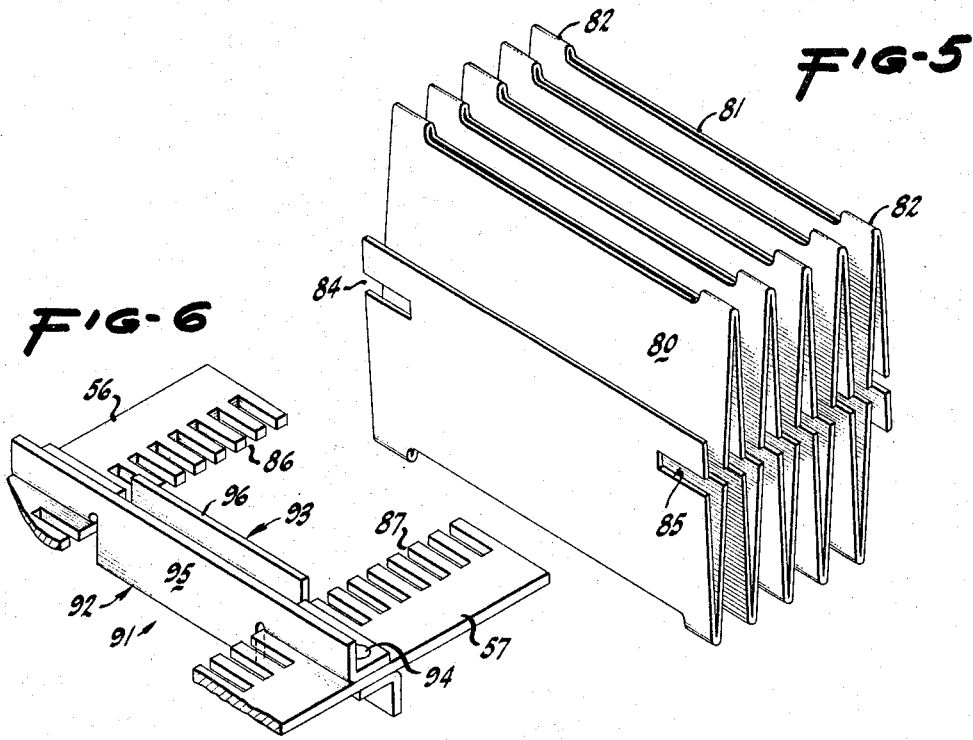
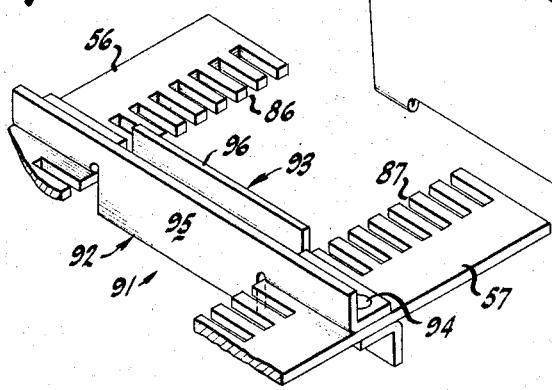
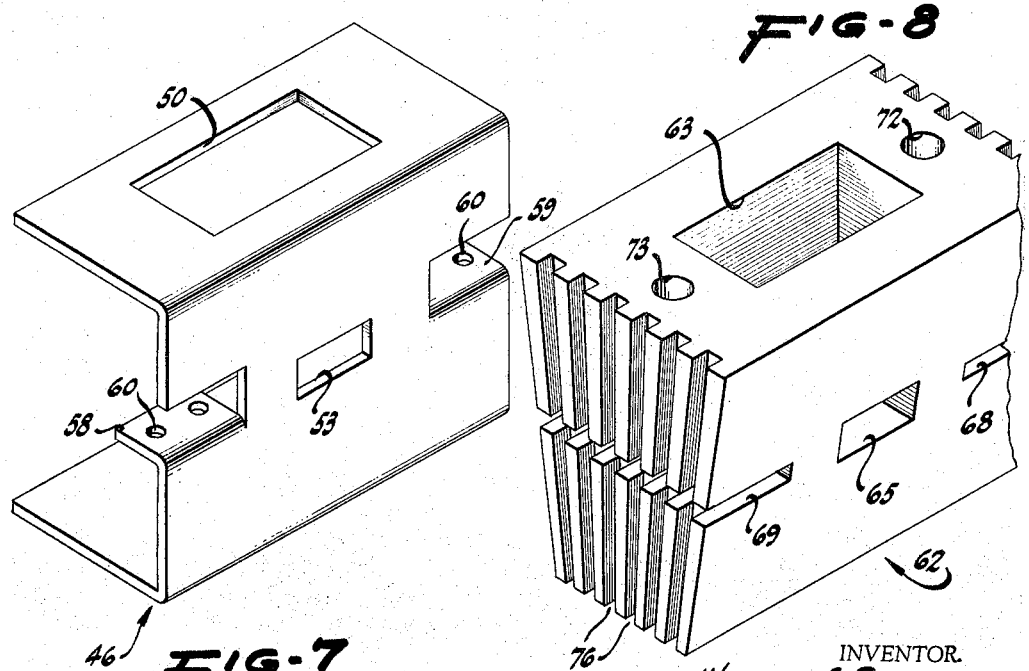
INVENTOR.
WILLIAM S. ROUVEROL
BY Gordon Wood
ATTORNEY Aug. 9, 1966 W. S. ROUVEROL 3,265,949
VARIABLE SPEED INDUCTION MOTOR
Filed Sept. 20, 1963 9 Sheets-Sheet 5

INVENTOR.
WILLIAM S. ROUVEROL
BY
Gordon Wood
ATTORNEY

Aug. 9, 1966   W. S. ROUVEROL   3,265,949
VARIABLE SPEED INDUCTION MOTOR
Filed Sept. 20, 1963   9 Sheets-Sheet 6
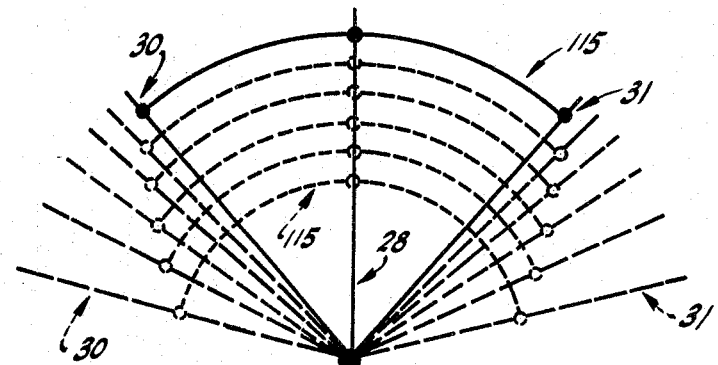
FIG-13
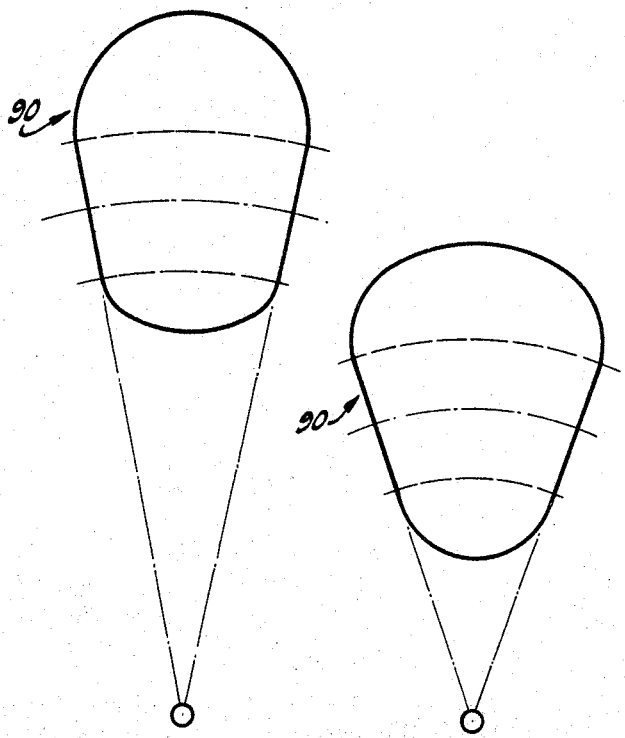
FIG-14   FIG-15
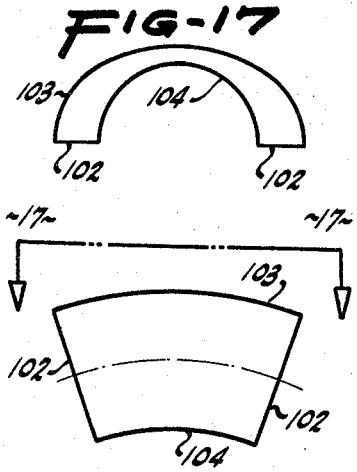
FIG-17
FIG-16
INVENTOR.
WILLIAM S. ROUVEROL
BY
Gordon Wood
ATTORNEY Aug. 9, 1966 W. S. ROUVEROL 3,265,949
VARIABLE SPEED INDUCTION MOTOR
Filed Sept. 20, 1963 9 Sheets-Sheet 7
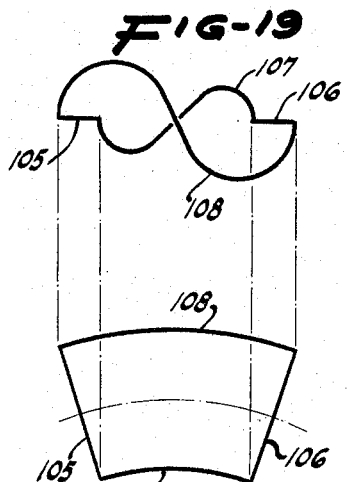
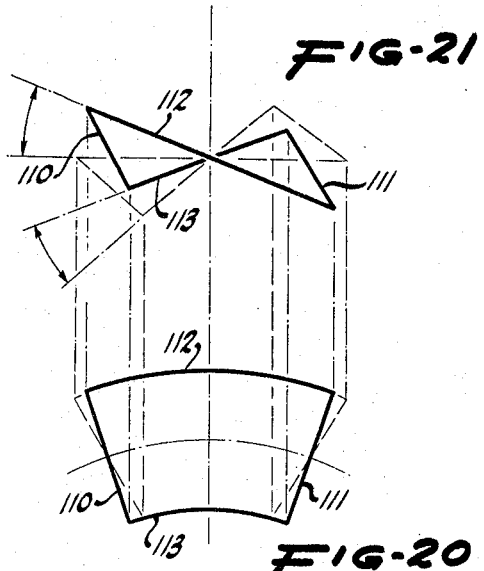
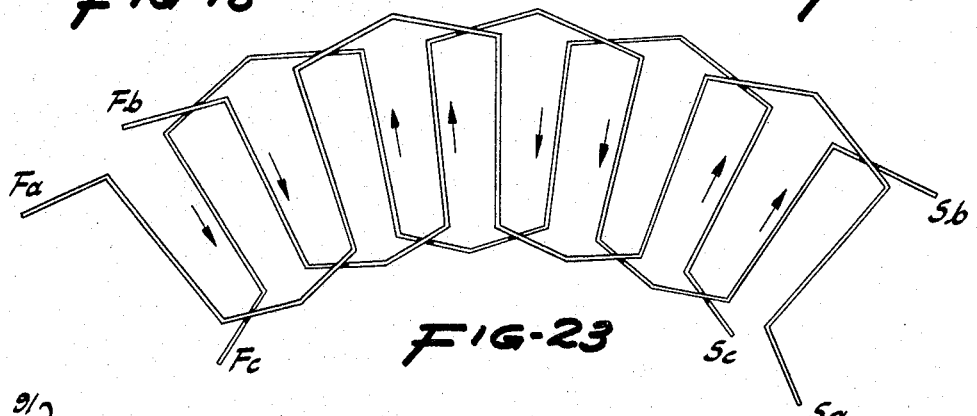
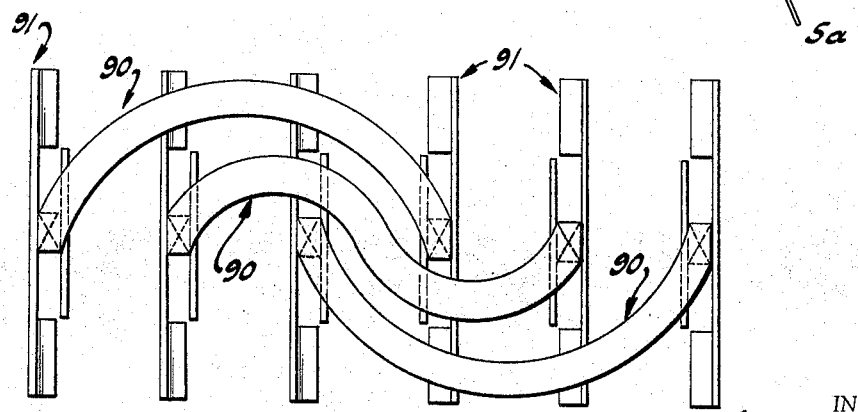
INVENTOR.
WILLIAM S. ROUVEROL
BY Gordon Wood
ATTORNEY INVENTOR.
WILLIAM S. ROUVEROL
BY
Gordon Wood
ATTORNEY

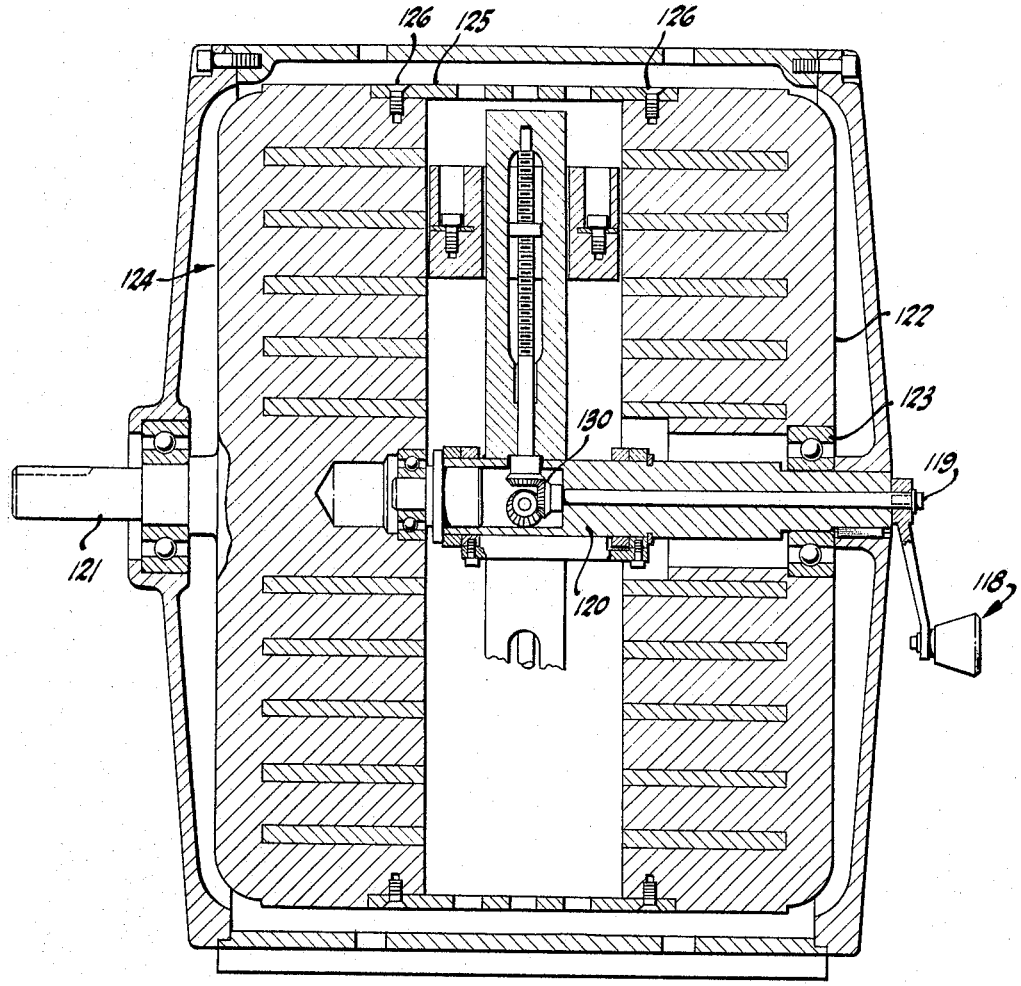

United States Patent Office 3,265,949
Patented August 9, 1966

3,265,949
VARIABLE SPEED INDUCTION MOTOR
William S. Rouverol, 1014 Shattuck Ave., Berkeley, Calif.
Filed Sept. 20, 1963, Ser. No. 310,401
14 Claims. (Cl. 318—243)

This invention relates to variable speed electric motors, and more particularly to alternating current induction motors in which a variable output speed is obtained by shifting at least one pole piece in such a way as to alter the path of the magnetic flux through the rotor.

Standard induction motors are ordinarily considered constant speed motors since the amount of slip they exhibit at full load is, in most cases, from one to five percent of the no load or "synchronous" speed. As the "synchronous" speed must be equal to the expression 120 $f/p$, large variations in speed are attainable in conventional induction motors only by altering the line frequency ($f$, cycles per second) or the number of poles ($p$). The first of these methods is electrically complicated and expensive, and the second produces only stepwise variations, as by changing the coil connection to give 8 or 4 or 2 poles. Minor speed variations can be accomplished by introducing resistance into the rotor circuit, but this involves mechanical and electrical difficulties associated with commutation and also reduces efficiency since the speed reduction is achieved entirely at the expense of dissipated power.

Prior efforts to construct variable speed induction motors have generally employed discontinuous pole pieces for the stator, utilizing what is sometimes called a "linear motor." The cylindrical stator of a conventional polyphase induction motor is in effect cut through at a radial plane and unrolled, or "developed." This results in a magnetic field that no longer rotates continuously about the rotor but instead translates repeatedly from one end of the stator to the other. Conducting loops placed in this translating field tend to move with the field in much the same way as the rotor conductors in a standard cylindrical induction motor.

Variable speed induction motors employing linear or discontinuous fields have been of two basic types. The earliest types utilized spherical rotors and obtained speed variation by twisting the stator blocks so that the field could be made to travel at some variable angle to the direction of motion of the rotor conductors. If the rotor conductors are parallel bars, they move more slowly than the field, as in the devices disclosed in U.S. Patent Nos. 1,514,474 and 1,559,920 to Steward. If the rotor conductors are in the form of a grid, the rotor then tends to travel at a greater velocity than the field, as in the devices of Nos. 2,848,675 and 2,856,573 to Williams et al. The theoretical rotor velocity is $v_f \cos \theta$ in the Steward devices and $v_f/\cos \theta$ in the Williams devices.

Inherent in these spherical configurations have been a number of difficulties, however, the most serious of which have been expensive construction and poor performance, including low efficiency, high slip, poor capacity relative to size, narrow useful speed range and poor power factor. All these disadvantages in performance are associated with each other and arise directly or indirectly from the fact that the useful tractive force exerted by the stator on the rotor is invariably less than ten per cent of what it is in standard cylindrical induction motors. Part of this is due to end effects in the discontinuous stators, but most of it comes from limitations in rotor copper cross sectional area (inherent in the spherical geometry), and from the production of braking torques by the movement of the field flux laterally with respect to the rotor conductors or at different (and in some cases negative) slip rates in the direction of motion of the rotor conductors.

There are no correctives for most of these deficiencies, at least in the case of spherical configurations.

The other method of achieving speed variations in a discontinuous stator type of induction motor is to vary the radial displacement of the stator with respect to the axis of the rotor. In these constructions the stator is mounted opposite the flat end-face of a cylindrical diskshaped rotor so that the angle through which the field flux sweeps may be reduced by moving the stator radially outward, as for example, in the devices disclosed in U.S. Patent Nos. 1,595,550 (Howard) 1,855,617 (Steward) and 2,856,573 (Williams). However, in none of these prior disclosures are the features essential to low slip, high efficiency, and high power factor incorporated.

The main object of the present invention, therefore, is to provide an improved type of discontinuous-stator variable speed induction motor which will operate over an extended range of speeds with continuous variability between those speeds and with high efficiency and low slip rates throughout.

A further object of the invention is to provide a variable speed motor that will have a large power capacity for its size, will be inexpensive to construct, and will retain the ruggedness, reliability and freedom-from-wear of conventional induction motors.

Another object of the invention is to provide a motor that will have a good power factor and will constitute a substantially balanced load for its polyphase power supply.

Another object of the invention is to provide a motor that may be mechanically driven to provide a variable frequency induction generator.

These and other objects and advantages of the invention will become apparent from the drawings as explained in the specification as follows:

FIG. 5 is a perspective of a portion of the accordion shaped pole piece structure.

FIG. 6 is a perspective of a portion of the supporting spines for the pole piece structure and showing a coil holder.

FIG. 7 is a perspective of one of the end connectors of the pole piece structure.

FIG. 8 is a perspective of the central rigid portion of the pole piece.

FIG. 13 is a schematic view showing the manner in which speed variation is achieved by changing the effective radius of the pole piece.

FIGS. 14, 15 are schematic side elevations of a field coil showing the manner in which the circumerentially-extending radially-spaced unsupported portions deflect in response to changes in radius of the pole piece.

FIGS. 16, 17 are schematic side elevations and top plan views respectively of a field coil showing the formation thereof to permit the flexing required by changes in radius of the pole piece support.

FIGS. 18, 19 are views similar to FIGS. 16, 17 showing another type of coil formation.

FIGS. 20, 21 are views similar to FIGS. 16, 17 showing still another type of coil formation.

FIG. 22 is a semischematic top plan view of the pole piece in the structure of FIGS. 1, 2 showing one manner of forming the coils to provide for radial shifting of the pole piece.

FIG. 23 is a schematic diagram of a modified form of field winding.

FIG. 29 is a view similar to FIG. 2 showing a modified form of motor construction.

Figure 1:
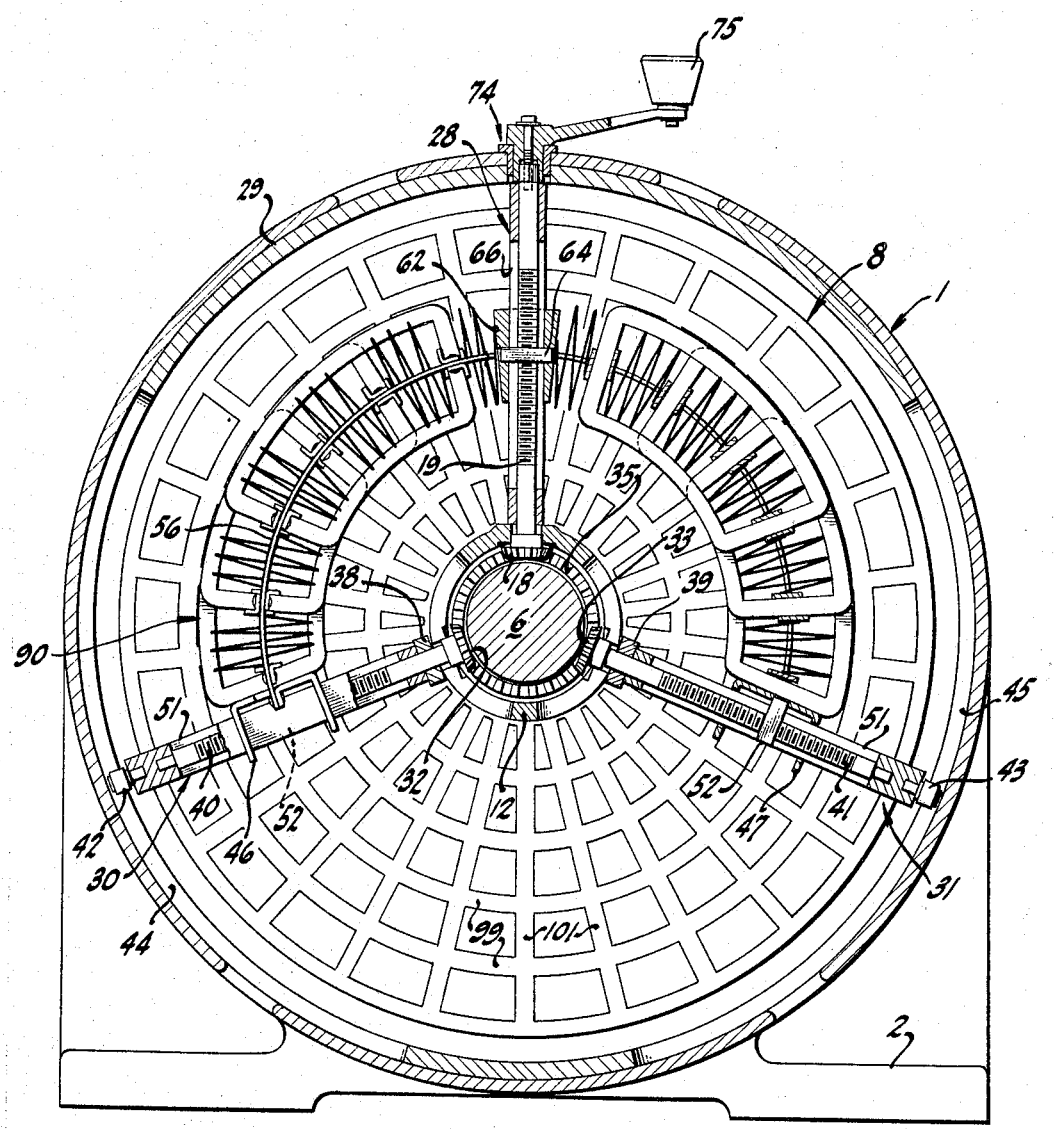
FIG. 1 is a vertical section through a three-phase four pole induction motor embodying the invention.
Figure 2:
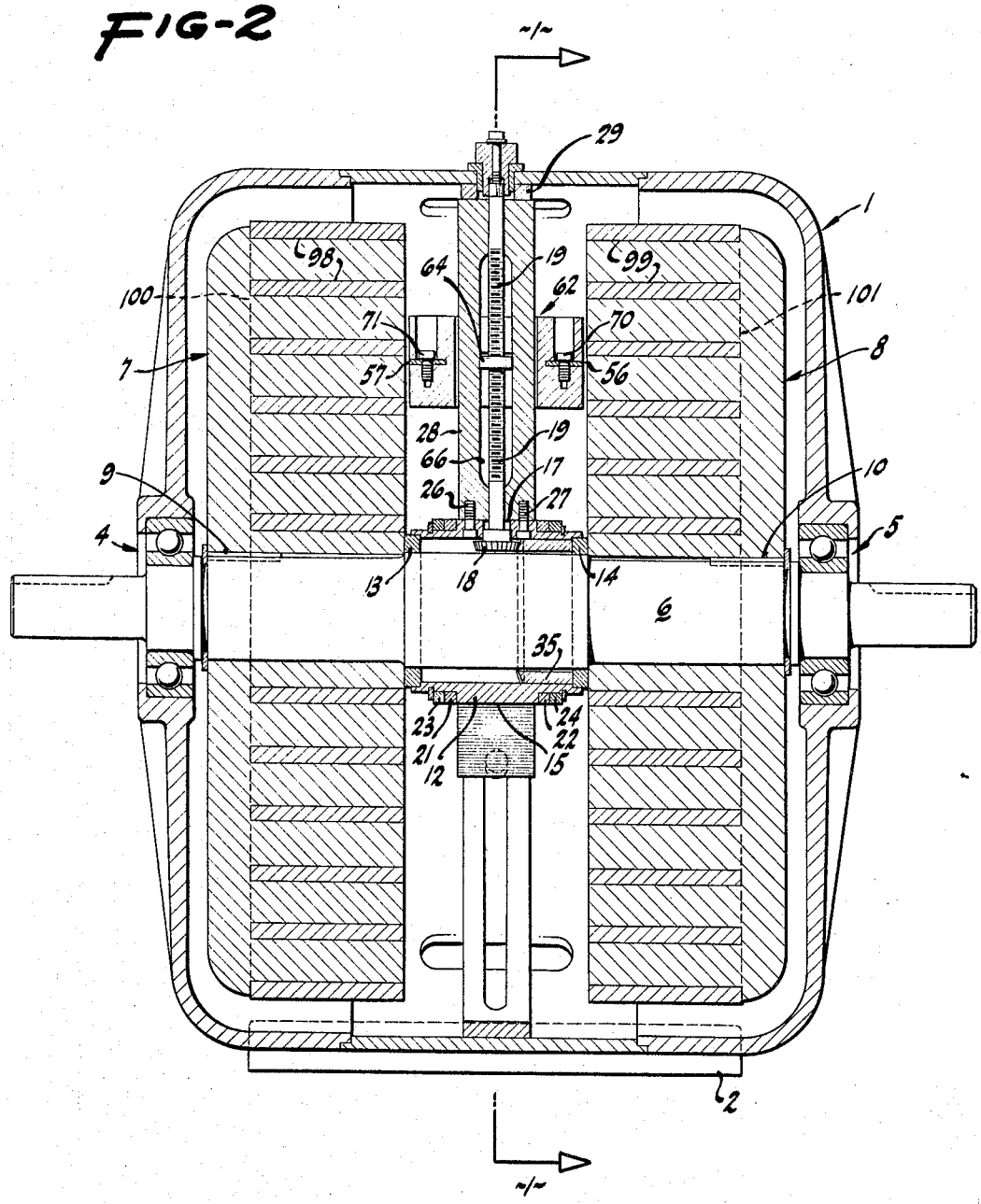
FIG. 2 is a vertical section taken through the central plane of the device of FIG. 1.

A preferred form of the invention is shown in FIGS. 1 and 2 wherein a housing generally designated 1 and including a base 2 is provided at opposite ends with bearings 4, 5 respectively (FIG. 2) in which is rotatably supported the rotor shaft 6. The rotor comprises left and right hand portions 7, 8 respectively which are axially spaced apart along the shaft 6 to accommodate between said portions the pole piece and the apparatus for shifting the same as will subsequently be described. Between rotor portions 7, 8 there is interposed an annular anchor sleeve 12 which is spaced radially outwardly from shaft 6 and concentric therewith and supported at its axially spaced ends on rings 13, 14, respectively in which shaft 6 is rotatable. The anchor sleeve 12 is provided with a central upset portion 15 which, at one point in its circumferential extent is provided with a bore 17 in which a bevel gear 18 is rotatably supported. Bevel gear 18 is carried at the inner end of a radially extending lead screw 19 for a purpose to be subsequently described.

On opposite sides of the upset central portion 15 of anchor sleeve 12 are two pairs of support rings; an inner pair 21, 22 on opposite sides of the upset portion 15 and an outer pair 23, 24. A pair of machine screws 26, 27 serve to secure the central portion of anchor sleeve 12 to a radially extending support arm 28 which supports lead screw 19.

Referring now to FIG. 1 it will be seen that support arm 28 is fixedly secured at its outer end to the central peripheral ring 29 which in turn is fixed to the inner surface of housing 1, and two similar support arms 30, 31 are provided at points equally spaced from the central fixed support arm 28. As will subsequently be described, the support arms 30, 31 are movably peripherally of the housing but are maintained at all times in a radial direction as seen in FIG. 1.

The inner ends of support arms 30, 31 are provided with bevel gears 32, 33 respectively, similar to bevel gear 18 above described. The three bevel gears 18, 32, 33 are in mesh with a sleeve bevel gear 35 which is rotatably supported between anchor sleeve 12 and shaft 6 and bears slidably against end ring 14. It will be apparent from FIGS. 1 and 2 that upon rotation of bevel gear 18 the bevel gears 32, 33 will be rotated in the same direction as bevel gear 18 through sleeve bevel gear 35. As best seen in FIG. 1 a connecting piece 38 between support rings 21, 22 serves to provide a bearing for bevel gear 32 while a similar connecting strap 39 between outer support rings 23, 24 serves to provide a bearing for bevel gear 33. Arms 30, 31 rotatably support radially extending lead screws 40, 41 and said arms are provided at the outer ends with rollers 42, 43 respectively which are received in peripherally extending grooves 44, 45 formed in ring 29. The arms 30, 31 are rectangular in cross section and slidably receive thereon connectors 46, 47 respectively. Said connectors are identical and one is shown in detail in FIG. 7. Said connectors are generally channel-shaped and the opposed flanges are provided with rectangular openings 50 (FIG. 7) through which the arms 30, 31 are received. The opposite sides of arms 30, 31 are slotted as at 51 to receive therethrough the ends of nuts 52 which threadedly receive the lead screws 40, 41. At this point it will be apparent that upon rotation of bevel gears 32, 33 the nuts 52 travel radially carrying with them the connectors 46, 47 which are provided with rectangular apertures 53 for receiving said nuts therethrough.

The connectors 46, 47 serve to support a pair of elongated spines 56, 57 (FIG. 6) which are fixedly secured at their ends to flanges 58, 59 on connectors 46, 47. Such securement is preferably effected by rivets passed through holes 60 in flanges 58, 59 (FIG. 7). As best seen in FIG. 1 the spines 56, 57 are bent to the form of a circular arc against their inherent resiliency and are supported centrally between their ends in a block 62 which is provided with a central rectangular aperture 63 for receiving therethrough the arm 28 (FIG. 1). A traveling nut 64 is received at its ends through holes 65 in block 62 so that upon rotation of lead screw 19 the block 62 moves radially in response to such rotation. Arm 28 is provided with longitudinally extending groove 66 for receiving the sides of nut 64 therein.

Block 62 is provided with outwardly opening peripherally extending side grooves 68, 69 respectively which receive therein the central portion of spines 56, 57 respectively. In order to fixedly secure block 62 to said spines a pair of screws 70, 71 are received through radially extending holes 72, 73 in block 62 (FIG. 8). With reference to FIG. 1 it will be seen that the spines 56, 57 are supported at their ends and also at their central points thus permitting said spines to be flexed to different radii of curvature depending on the particular position of said spines relative to the axis of the protoshaft. The driving lead screw 19 is rotatably supported at its outer end in bearing 74 fixed to the housing 1 and may be rotated by means of crank 75 in order to achieve the desired position of spines 56, 57. At this point it will be noted that upon rotation of crank 75 in one direction, the spines 56, 57 will move radially outwardly while maintaining their arcuate shape and rotation of crank 75 in the opposite direction will cause spines 56, 57 to move radially inwardly.

Spines 56, 57 constitute the supporting means for the pole piece of the present invention and permits that pole piece to be moved radially with reference to the axis of the rotor. At this point it will be understood that the construction of the pole piece must be such as to provide a high density of iron in order to permit the creation of as many lines of force as possible and at the same time the construction must be rigid enough so that said pole piece is able to withstand the relatively high tractive forces thereon. On the other hand the pole piece must be sufficiently flexible to permit the adjustability required by the present invention. The method of achieving this construction will now be described.

Figure 4:
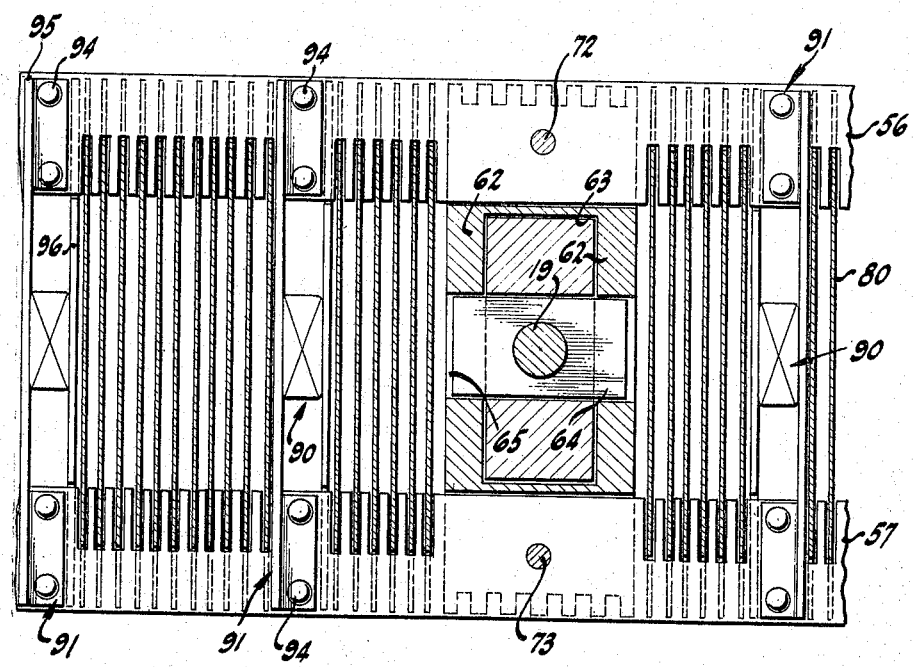
FIG. 4 is a fragmentary top plan view of the pole piece of FIG. 3.

The general construction of the pole piece is shown in FIG. 5 and it is seen that the same comprises a plurality of planar rectangular elements 80 formed by numerous closely spaced accordian pleats folded from a strip of high permeability iron. The junctures between adjacent pleats are cut away as at 81 centrally of the lengths of said junctures to provide hinge portions 82 at the ends of said junctures and so that the central portions of said junctures are recessed to accommodate the windings of the field coils as will subsequently be described. Centrally between the radially spaced ends of each pole element the same is slotted at its opposite side edges to be received on spines 56, 57. Said slots are indicated at 84, 85 in FIG. 5. It will be seen from FIG. 4 that the opposite axially spaced side edges of the pole pieces are generally coterminus with the opposite outer edges of the spines 56, 57. The spines 56, 57 are also provided with oppositely inwardly opening slots 86, 87 respectively for receiving the pole elements. By this structure it will be apparent that an effective connection is achieved between the spines and the pole piece elements and at the same time a slight amount of swinging movement of said elements is permitted to accommodate the pole piece to the flexure resulting from a change in radius of the same.

It should be understood that the spacing between adjacent planar pole elements 80 is exaggerated for clarity, and that the elements may be brought very close together in order to enhance the number of lines of force that may be established. In order to simulate in the block 62 the end conditions that are established by the pleated pole construction a plurality of closely spaced radially extending grooves 76 (FIG. 8) are formed in the axially spaced ends of block 62.

Figure 3:
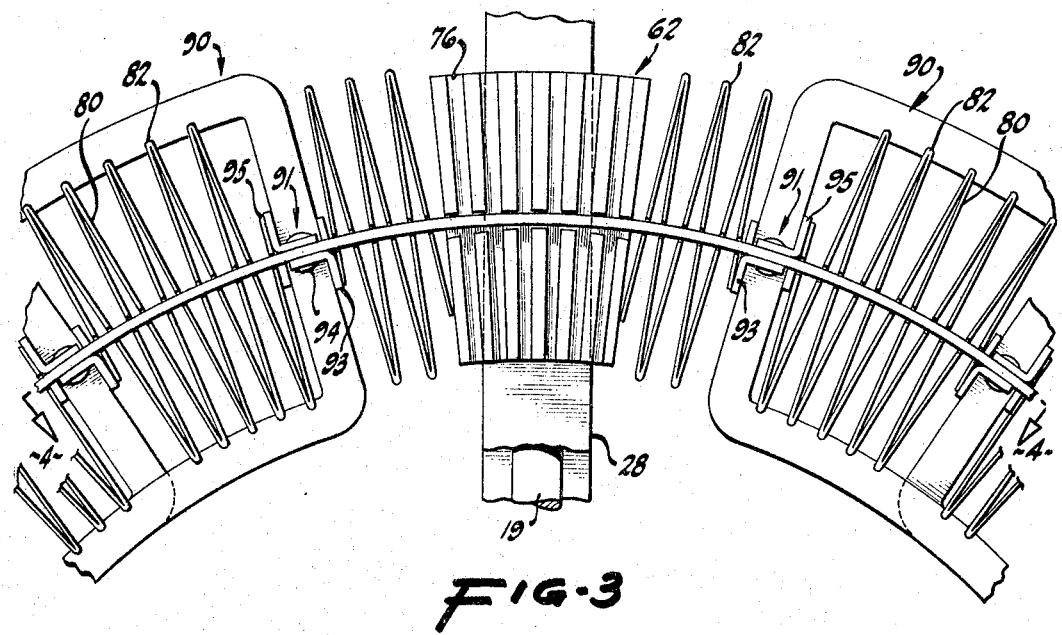
FIG. 3 is a greatly enlarged side elevation of the central portion of the pole piece of FIG. 1.

Although the present invention contemplates various types of windings for the pole piece, the method of securing one particular arrangement of windings is shown in FIGS. 1 and 3. Coils 90 are arranged generally in planes perpendicular to the axis of the rotor and each comprises a pair of opposed circumferentially extending runs radially spaced apart and connected by radially extending runs which are connected to the spines 56, 57 in a manner now to be described. At spaced points along the length of spines 56, 57 a coil holder generally designated 91 (FIG. 6) is provided. Each coil holder 91 comprises a pair of generally angle shaped elements 92, 93 one element 92 being secured to the radially outwardly directed sides of spines 56, 57 and the other element 93 being secured to the radially inwardly directed sides. Rivets 94 secure the corresponding flanges of elements 92, 93 to the spines as best seen in FIG. 6. It will be noted that intermediate the spines 56, 57 the flanges 95, 96 define a radially extending space therebetween which is adapted to receive the radially extending runs of the coils 90 as best seen in FIG. 3. It will be noted in FIG. 5 that the relieved junctures 81 between adjacent pole piece elements 80 provide effective supports for the peripherally extending runs of the coils 90 as best seen in FIG. 3. By this arrangement of field coils, it will be apparent that the accordian pleated core made up of the elements 80 provides a relatively dense concentration of iron which is magnetized by the current flowing in the coils 90 so that the lines of force constituting the magnetic field extend axially of the rotor from the edges of the pole piece and are adapted to be cut by the two opposed portions 7, 8 of the rotor (FIG. 2).

The rotor portions 7, 8 are preferably formed of cast silicon steel and are provided with axially extending annular recesses into which copper may be cast to form conductors 98, 99 respectively on rotor portions 7, 8 (FIG. 2). The rotor portions 7, 8 are further provided with radially extending recesses also adapted to receive copper therein to form radially extending conductors 100, 101 on rotor portion 7, 8 respectively and connecting the annular conductors 98, 99. By this structure it will be apparent from FIG. 1 that a grid-like arrangement of conductors is provided and in which conductors the induced currents flow when the field coils are energized and the motor is running.

By the above described structure it will be seen that an extremely rigid pole piece is effected which nevertheless may be readily shifted radially to various adjustable positions as shown schematically in FIG. 13. It is emphasized that the planar elements 80 that form the pole piece are shown semi-schematically in FIGS. 1 and 3 and in actual practice said elements should be as close together as possible and still permit the desired adjustment of the pole piece position.

Since it is desirable that the coils 90 be firmly mounted on the pole piece and at the same time have enough flexibility to permit the radial adjustable movement of the pole piece it is necessary to provide a freedom of movement of the circumferentially extending runs of the coil; this may be accomplished in several ways. It will be apparent from FIG. 13 that the pole piece indicated schematically at 115 may be adjustably shifted from an outermost position shown in full line to various positions of reduced radius shown in dotted lines. Of course the radially extending arms 30, 31 must move circumferentially as indicated as the position of the flexible pole piece changes, and such movement is accomplished by the drive mechanism hereinbefore described. The pitch of the threads on lead screws 40 and 41 will of course need to be slightly different than that on lead screw 19, to correct for their angular movement.

The above described movement of the flexible pole piece results in a change of form of the coils 90 which must be provided for. In this connection it will be noted that as the radius of curvature of the spines 56, 57 decreases, the shape of coils 90 shown schematically in FIGS. 14, 15 changes from the shape shown in FIG. 14 to the shape shown in FIG. 15. Since it is usually desirable not to permit the coil ends to occupy excessive radial space, the configuration of FIGS. 14, 15 may be replaced by more compact configurations. For example, with reference to semi-schematic FIG. 22 wherein the peripherally extending runs of the coil are shown it will be seen that the required amount of flexibility may be achieved by forming the circumferentially extending runs to arcuate shapes as indicated. Similarly, in FIGS. 16, 17 the radially extending runs of the coil are connected by curved outer and inner circumferentially extending runs 103, 104 respectively.

In FIGS. 18 and 19 the radially extending runs 105, 106 are connected at their outer ends by circumferentially extending run 108 which is S-curved as indicated to provide flexibility required when the pole piece is flexed. In like manner the inner run 107 is similarly shaped for the same reason. In FIGS. 20, 21 it will be seen that it is not necessary to curve the circumferentially extending runs and they may be straight as indicated. It will be noted that when the radially extending runs 110, 111 swing about their centers, the circumferentially extending runs 112, 113 may shift and swing about radial axes in order to accommodate themselves to the shift of the radial runs.

Figure 24:
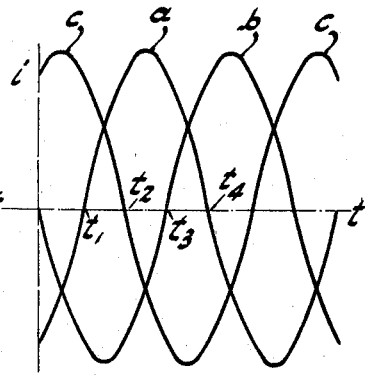
FIG. 24 is a schematic diagram showing the relationship of the current and time in the three-phase two-pole windings of FIGS. 25–28.

The windings shown in FIGS. 1, 3 and 22 are intended to be connected in the standard manner for four-pole linear motors (e.g., FIG. 13 of U.S. Patent No. 2,856,573). However, there are other possible connections for two- and four-pole windings, such as shown in FIGS. 23 and 25-28. These alternative windings employ an inductive coupling of the leading and lagging coils, for purposes which will be explained in due course. FIGS. 24-28 show schematically the correlation between the variations in current in a three-phase power supply and the movement of the magnetic poles in a two-pole arrangement. In FIG. 24 the three phases are indicated at "$a$," "$b$" and "$c$" and current is plotted against time. "Start" is indicated by "S" and "Finish" indicated by "F." FIGS. 25-28 indicate the conditions of the poles at points $t_1$ to $t_4$ respectively in FIG. 24. FIG. 23 shows a similar wiring arrangement for a four-pole motor of the type shown in the preferred embodiment of FIG. 1.

FIG. 29 illustrates a modification of the structure of FIG. 2 wherein the handle 118 for adjusting the position of the pole piece is mounted on a shaft 119 which extends axially through the rotor shaft 120. Rotor shaft 120 combines with another rotor shaft 121 to rotatably support the rotor. Shaft 120 is stationary and the right hand portion 122 of the rotor is rotatably supported thereon by means of bearing 123. Said right hand portion 122 is fixedly secured to the left hand portion 124 by means of a peripheral sleeve 125 and is secured to both halves of the rotor by screws 126. The inner end of shaft 119 is provided with bevel gear 130 which meshes with the three bevel gears carried by the three arms in a similar manner to the arrangement of arms shown in FIG. 1.

Figure 9:
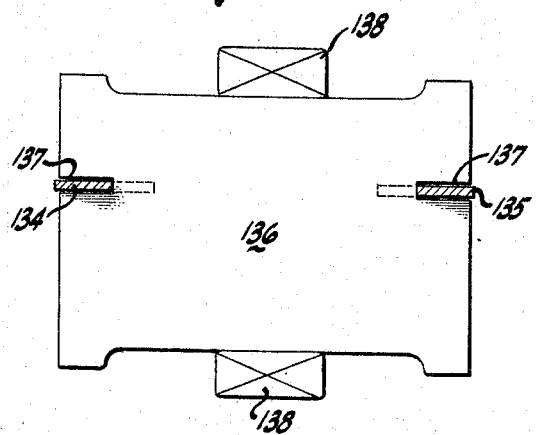
FIG. 9 is a side elevation of a typical modified pole piece element.
Figure 10:
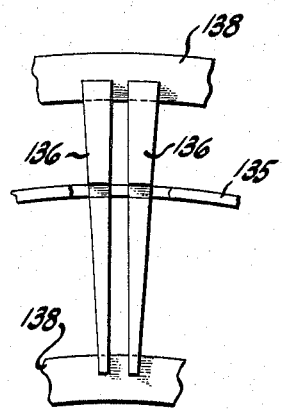
FIG. 10 is an end elevation of a pair of elements of FIG. 9.

A modified form of pole piece construction is shown in FIGS. 9, 10. In this structure spines 134, 135 are substantially identical to spines 56, 57 of the preferred form and the pole piece elements comprise separate wedge-shaped elements 136 which are provided with slots 137 at their opposite edges for receiving the spines 134, 135. Coil 138 is of course wound around the peripheries of the elements 136 in much the same manner as in the structure shown in FIG. 3. If desired these wedge or trapezoidal pole piece segments 136 could be as wide as one third of a coil pitch.

Figure 11:
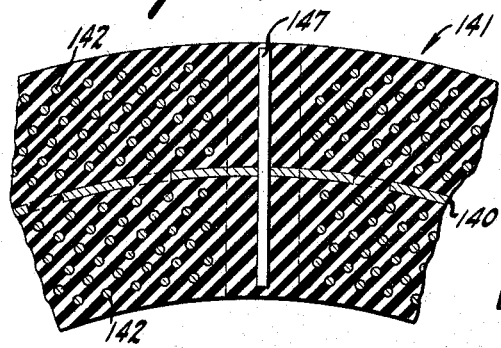
FIG. 11 is a fragmentary and elevation of another modified form of flexible pole piece.
Figure 12:
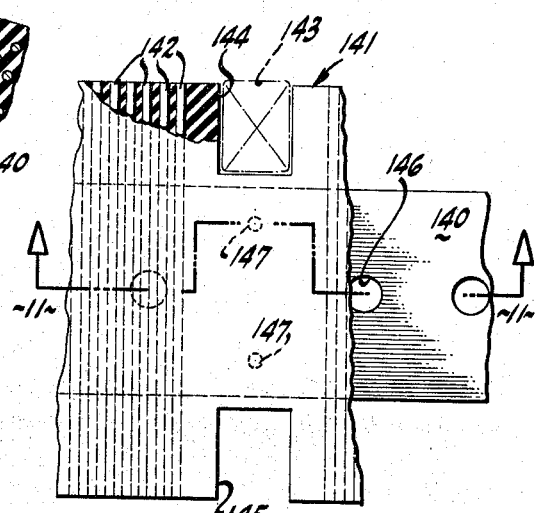
FIG. 12 is a fragmentary top plan view of the structure of FIG. 11.
Figure 25:
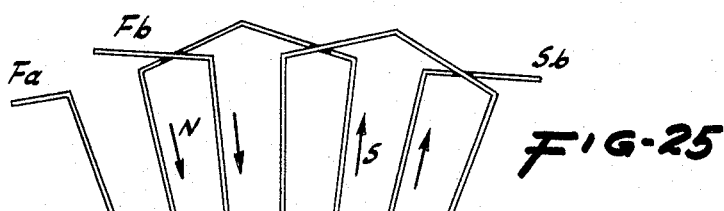
FIGS. 25–28 are schematic diagrams indicating movement of the north and south poles in a two pole arrangement.
Figure 26:
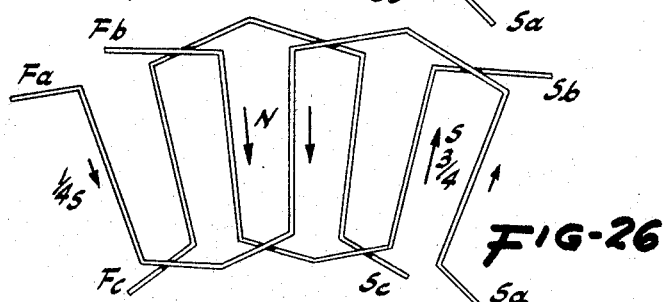
Figure 27:
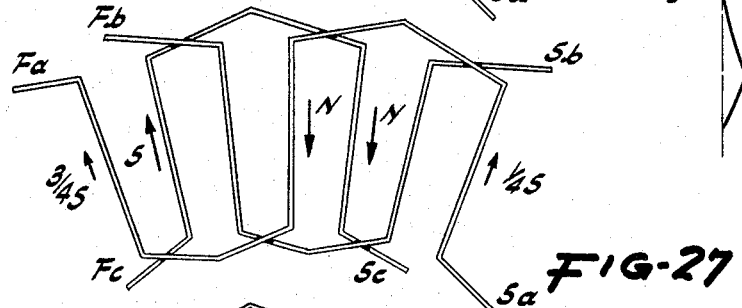
Figure 28:
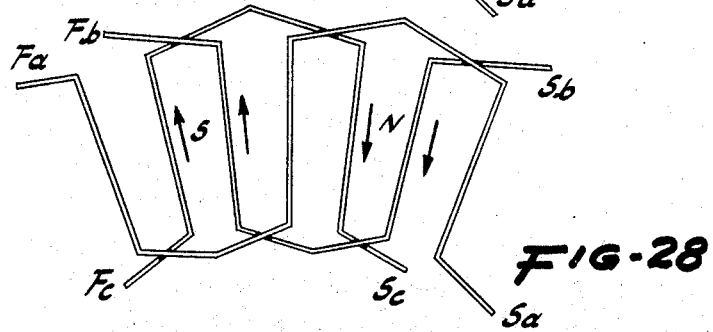

In lieu of a pair of axially spaced apart spines only one spine such as indicated at 140 in FIGS. 11, 12 may be employed. In this modified structure a relatively heavy body 141 of flexible resilient material such as rubber may be integrally molded with spine 140 centrally received therethrough and with numerous closely spaced wires or rods 142 embedded therein and extending axially of the motor in order to direct the lines of force as required.

In the structure of FIGS. 11, 12 the coils 143 may be arranged in planes perpendicular to the axis of the rotor as before by providing radially extending slots 144, 145 (FIG. 12) at spaced points around the rubber body for receiving the radially extending runs of the coils. Apertures 146 in spine 140 assist in obtaining a good integral connection with the rubber and radially extending rods 147 fixedly secured to spine 140 may be employed for the same purpose. The structure of FIGS. 11, 12 does not permit as great a density of flux as the structure of FIG. 3 but has the advantage of providing a less expensive production assembly.

MAXIMIZATION OF TRACTIVE FORCE

The tractive force per unit area of pole face (lbs./sq. in.) in an induction motor is given by the expression $F = BI/11,300,000$ where B is the flux density in lines/sq. in. and I the current in all the conductors under the square inch being considered. The maximum flux density across the air gap cannot be expected to exceed about 60,000 lines/sq. in., and since both B and I vary sinusoidally, the average value of each will be 0.707 times the maximum, and an average value for tractive force per unit area throughout the pole face will therefore be $F = I/380$. In conventional large induction motors the average tractive force at rated load reaches three or four pounds per square inch, which therefore indicates that rotor currents in excess of 1000 amperes are induced. To induce such currents in any induction motor rotor it is of course necessary to maximize the E.M.F. developed in the rotor conductors, and to minimize their resistance. Minimum resistance is attained by (a) minimizing the length of the rotor current paths, which calls for the use of "middle rings" that give the rotor its grid-type construction; and (b) maximizing conductor cross sections. It may be shown by differentiation that the conductor widths may profitably be increased until they reach half the width of the rotor iron wedges between them, but that further widening reduces the flux density more rapidly than it reduces resistance (increases current) and therefore gives rise to a net loss of tractive force. The depth of the conductors, on the other hand, may be considerable, limited only by the deleterious effects of flux leakage and the reactance associated with it.

As for maximizing the rotor E.M.F., this depends on the rate at which the rotor conductors cut the field flux, which, of course, increases directly with the slip. However, it has been noted above that even were it not essential to keep the slip rate low as a desirable performance characteristic in itself, it would be essential to do so in order to restrict the eddy current losses in the laminated rotor (as these increase with the square of frequency) and to maintain a high rotor power factor for maximizing the tractive force. But it may be noted that these requirements are not entirely contradictory, since the latter ones (eddy current losses and power factor) depend on slip rate, while the E.M.F. induced in the rotor conductors varies with absolute slip. Optimization of tractive force therefore dictates the highest practical operating speed which will automatically gave the maximum absolute slip $f$ or a given slip rate. In other words, it is desirable to employ the longest possible pole piece with the fewest possible number of poles. The longest possible pole piece will obviously be a flexible one such as shown in FIGS. 1 and 13 but would be spiral and would have perhaps two or more full turns when it is wrapped to its least radius. The circular pole shown in FIGS. 1 and 13, however, has a length sufficient to give a very respectable capacity, and in fact even the minimum number of poles has not been used in the interest of a more convenient output speed range and somewhat smaller stator copper losses. Two pole windings (as well as six, eight or more) could obviously be used on the flexible pole of FIG. 1, if desired.

Another condition for maximizing the tractive force exerted on the rotor is the avoidance of regenerative or braking effect and also back E.M.F.'s in the rotor conductors especially if they are long ones. Braking effects may occur in a radially shifted non-continuous stator induction motor if the rotor speed at any point exceeds the traveling field speed. At such points there will be "negative" E.M.F.'s induced in the rotor conductors, which will cause generator-action currents to flow if the rotor has grid-type conductors (FIG. 1) or greatly reduced motor-action currents to flow in the case of rotors with long conductors. In any induction motor employing a grid-type rotor, low slip operation will generally be possible only if the rotor speed matches the field speed over the entire stator.

A structure that allows for radial movement of 60° arc rigid stators permits a speed variation ratio of about 4 to 1 without deviation from the ideal rotor speed at the centerline of the stator by more than 1.5%. This means that if the slip rate is 3% or more, there is no braking action, even though some portions of the stator are doing more work than others. However, at all radial positions of the stators other than that corresponding to the stator arc radius, the innermost and outermost edges of the stator may have high positive or negative slip rates, reaching at the extreme ratios 15 or 20%. This, however, is not serious if there are no "middle rings" in the rotor that provide closed circuits for local regions of high slip, for if there are not, the direction and magnitude of the rotor current is determined by average slip, so the field or rotor velocity deviations at the stator edges affect neither the magnitude of the rotor current nor its phase angle, and hence do not diminish the tractive force exerted on the rotor. The necessity of using these long conductors with no middle rings however taken together with the shortness of the poles, will cause machines having radially movable rigid poles to deliver only 10 or 15% of the power delivered at the same slip rate by a machine of the same diameter and same number of poles but fashioned after the construction of FIG. 1.

LIMITING OF END EFFECTS

Just as the water elements of an ocean wave do not translate with the wave but simply move up and down in elliptical orbits, the magnetized material in a linear motor stator does not move either. The traveling polyphase field is thus a rather illusory concept so far as the stator is concerned: the field is in fact simply a series of superposed oscillating fields that combine to give the effect of motion, so that they can drive an induction rotor in much the same manner as an ocean wave may drive a surfboard.

However, the ocean wave analogy ceases to apply to the rotor once it begins to turn. Magnetized material is physically transported from one stator-pole path to another, and as a result the reactance of the several stator coils is not the same. The first coil has the greatest reactance since it must create its own field, while succeeding coils because of their overlapped configuration in effect inherit considerable magnetized material by virtue of the turning of the rotor and hence have a lower reactance. The last coil has, of course, the smallest reactance of all, and the greatest flux density.

The build-up of the flux at the leading edge of the stator and its decay at the trailing edge produce transient current components in the particular rotor circuits linked by the flux, and the electric and magnetic energy involved tends to be a greater or lesser extent dissipated in random harmonics, mostly beyond the trailing edge. This effect tends to be a serious one in a two-pole stator, but is not a major handicap in motors of four or more poles. The more poles the less significant will this "end effect" be. But since it has been shown above that capacity increases rapidly with increased operating speed, means are needed to minimize the effects of stator discontinuousness in four-pole and especially two-pole motors. In fact, the use of radially movable rigid pole pieces is of very limited practicality unless two-pole stators can be employed. Some alterations that may be utilized to improve the performance of short stators are as follows:

(1) *Inductive coupling of the leading and trailing edges of the stator.*—Although previous non-continuous stators have been in effect formed by cutting a continuous stator between groups of coils, as in Williams U.S. Patent No. 2,856,573, FIG. 13, it is equally possible to make the cut at a coil side so that half the coil side is placed at one end of the stator and half at the other, as in FIGS. 25–28 herein, where phase "a" makes three passes across the stator but the interior phases "b" and "c" only two. The phase "a" coils may be made from a single large diameter coil twisted into a figure eight, or of two separate coils in series connection and both having one side in the center slot. An analogous winding may be used for the end coils of a stator having four (or more) poles by twisting one large coil into four (or more) smaller coils, or by connecting four (or more) half-coils in series. The need for inductive coupling is greatest in a two-pole stator, especially where the number of poles is not an integral multiple of the number of phases (e.g. FIG. 23) and hence there is an imbalance in the power loads and power factors for the three phases.

(2) There are a number of other features which may be utilized to obtain optimum performance from two-pole and four-pole stators. These are particularly necessary for two-pole stators, where the "synchronous speed" is actually only about 90% of the theoretical field speed because a conducting loop in the rotor experiences a change in linking flux due to the gradual flux build-up, which it tries to compensate for by moving more slowly than the flux wave (sliding back down the wave). In the latter part of the pole piece, the flux is more uniform, so synchronous speed for the rotor is closer to the synchronous speed of the flux wave. Hence, the trailing end of the stator drives the leading edge almost as a generator, and this causes a considerable loss of torque in a two-pole stator. Some of the methods of combatting this effect may produce an unsymmetrical stator, which will give its best performance only for rotation in one direction. However, this is not a serious drawback in the constructions having shafts at both ends (FIGS. 1 and 22), since these machines are mechanically reversible simply by turning them end-for-end. Features available to improve short-stator performance include:

(a) Varying the air gap along the length of the stator.

(b) Varying the coil slot spacing along the length of the stator.

(c) Using unequal numbers of coil turns.

(b) Using different wire sizes in some coils.

(e) Connecting in series two or more coils occupying different positions on a pole piece of four (or more) poles or occupying different positions on two or more separate pole pieces.

Any combination of these features that will give the greatest degree of load balance among the several phases of a polyphase supply will of course be the preferred combination.

OTHER IMPROVEMENTS

It will be evident to any person skilled in the design of electrical machinery that as the invention relates to a highly developed art, namely the induction motor, many of the improvement devices for the widely used machine may be advantageously applied to the invention including, for example:

(1) Double squirrel-cage construction to improve starting torque.

(2) Shaded-pole construction for single phase motors.

(3) Wiring of the stator for two-phase power supply or for single phase power supply split into two phases by one or more impedance devices such as resistors or capacitors.

(4) Use of fan blades integrally cast into the backs of the rotors to aid cooling.

(5) Explosion-proof or drip-proof housings.

(6) Switching devices to change the number of poles on a pole piece (e.g. 8 to 4 or 4 to 2).

(7) Double layer windings to reduce effect of harmonics.

(8) Used of conductors that are slightly spiral rather than radial, to obtain smoother entry into the field.

Other modifications that may be made in the devices disclosed here include:

(1) Provisions to allow slight axial movement of one or both rotor portions 7, 8 (FIG. 2) to adjust the air gap.

(2) Use of a single rotor portion with full width conductors and flexible pole pieces on each side having laminated arcuate elements extending in the circumferential rather than the radial direction.

(3) Use of more than three swinging arms to control the flexible pole piece.

(4) Use of a plurality of flexible pole pieces, especially a number equal to the number of phases of the power supply.

(5) Use of high hysteresis plastic or elastomer material against and between the pole piece elements (FIGS. 5, 10) to prevent vibration of same.

Still other modifications evident to one skilled in the art may be envisaged falling within the spirit of the invention as disclosed and claimed herein. For example, it would be possible to employ a construction and mounting for the flexible pole piece so that it could be deformed circumferentially, in addition to or as an alternative to the combined bending and radial shifting shown in the figures, and the rotor surfaces adjacent to which these various types of flexible pole pieces operate could obviously by made conical, spherical or cylindrical, without altering the basic operation of the invention.

For the purposes of the following claims the term "magnetically permeable" shall mean having a magnetic permeability at least fifty times that of air.

I claim:

1. In a variable speed induction motor having a rotor including a matrix of magnetically permeable material and rotatably supported on an axis and provided with conductors in which induced currents flow, a discontinuous pole piece alongside said rotor and adapted to receive field windings thereon, said pole piece having magnetically permeable elements disposed on an arc about said axis and having sufficient flexibility to permit the curvature of said arc to be changed.

2. A structure according to claim 1 wherein a field coil is supported on said pole piece, said field coil having flexible portions adapted to deflect in response to changes in shape of said pole piece.

3. A structure according to claim 1 wherein said pole piece comprises a plurality of hingedly connected planar pole piece elements arranged in planes extending generally radially of said rotor axis.

4. A structure according to claim 1 wherein field coils are wound around groups of said elements to create magnetic poles.

5. A structure according to claim 4 wherein mounting means are provided for supporting said pole piece for shifting the latter to different positions closer to and further away from said axis.

6. In a variable speed induction motor having a rotor including a matrix of magnetically permeable material and rotatably supported on an axis and provided with conductors in which induced currents flow, a discontinuous pole piece alongside said rotor and adapted to receive field windings thereon, said pole piece being formed to an arcuate shape and extending circumferentially relative to said axis, said pole piece being formed with a body portion made of an elastomer material in which are embedded a plurality of magnetically permeable elements.

7. A structure according to claim 6 wherein coils are wound on said body portion and encompassing groups of said elements.

8. In a variable speed induction motor having a rotor including a matrix of magnetically permeable material and rotatably supported on an axis and provided with conductors in which induced currents flow, a discontinuous pole piece alongside said rotor and adapted to receive field windings thereon, said pole piece being formed to an arcuate shape and extending circumferentially relative to said axis, said pole piece being formed by a plurality of trapezoidal-shaped elements, and means for supporting said elements.

9. A structure according to claim 6 wherein coils are wound around groups of said elements to create magnetic poles.

10. A variable speed induction motor comprising:

a rotor provided with means for conducting induced currents therein and formed to provide a pair of axially spaced portions having a pair of opposed axially directed faces defining an annular space therebetween, an elongated circumferentially extending pole piece in said space and having a pair of opposite axially spaced sides adjacent said faces respectively, mounting means for supporting said pole piece for adjustable radial movement to different distances from the axis of said rotor for varying the speed of the motor, said pole piece being formed to provide flexibility permitting the radius of curvature of the same to be changed during said adjustable movement.

11. A motor according to claim 10 wherein said mounting means holds said pole piece to an arcuate shape at all times.

12. A variable speed electric motor comprising:

a rotor provided with a planar face and an elongated flexible pole piece supported alongside said face, windings carried by said pole piece for forming a magnetic field having lines of force extending axially between said pole piece and said face, means for adjustably shifting said pole piece radially to different distances from the axis of said rotor, and means for maintaining the shape of said pole piece in an arc of a circle at all times, a field coil supported on said pole piece and including flexible portions adapted to deflect in response to changes in shape of said pole piece.

13. A variable speed induction motor comprising:

a rotor rotatably supported about an axis and provided with a matrix of magnetically permeable material and conductors in which induced currents flow, a pole piece supporting field windings thereon, said pole piece being deformable and supported for shaping to different forms for registering with different areas of said rotor.

14. In a variable speed induction motor having a rotor including a matrix of magnetically permeable material and rotatably supported on an axis and provided with conductors in which induced currents flow, a discontinuous pole piece alongside said rotor and adapted to receive field windings thereon, a plurality of coils supported on said pole piece, the terminal coils of said pole piece being connected to the same power supply phase and wound in the opposite sense.

References Cited by the Examiner

UNITED STATES PATENTS

| | | | |
|---|---|---|---|
| 1,595,550 | 8/1926 | Howard | 318—243 XR |
| 1,855,617 | 4/1932 | Stewart | 310—209 XR |
| 2,185,990 | 1/1940 | Schurch | 318—243 |
| 2,550,571 | 4/1951 | Litman | 310—268 XR |
| 2,848,675 | 8/1958 | Williams et al. | 310—243 |
| 2,950,401 | 8/1960 | Evans et al. | 310—44 |
| 3,017,528 | 1/1962 | Ellis | 318—243 XR |

MILTON O. HIRSHFIELD, *Primary Examiner.*

ORIS L. RADER, *Examiner.*

D. F. DUGGAN, *Assistant Examiner.*